No. 866,297. PATENTED SEPT. 17, 1907.
G. NOYES.
PNEUMATIC TIRE.
APPLICATION FILED DEC. 4, 1905.
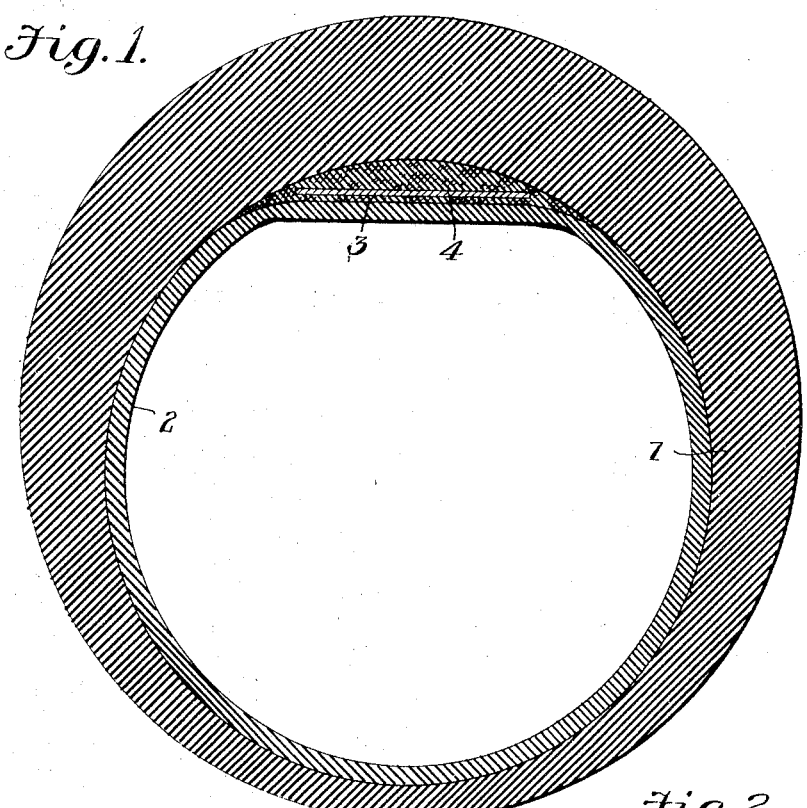
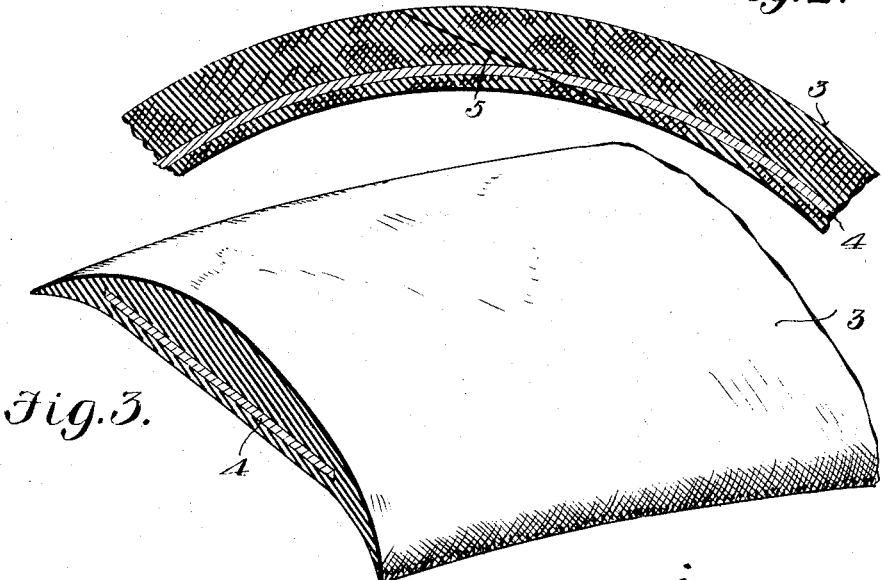

UNITED STATES PATENT OFFICE.

GEORGE NOYES, OF MANDAN, NORTH DAKOTA.

PNEUMATIC TIRE.

No. 866,297.  Specification of Letters Patent.  Patented Sept. 17, 1907.

Application filed December 4, 1905. Serial No. 290,253.

*To all whom it may concern:*

Be it known that I, GEORGE NOYES, a citizen of the United States, residing at Mandan, in the county of Morton and State of North Dakota, have invented a new and useful Pneumatic Tire, of which the following is a specification.

This invention relates generally to pneumatic tires, and more particularly to one of that class adapted to be used upon automobiles.

The object of the invention is in a simple, thoroughly feasible and practical manner, and without in the least detracting from the resiliency of the tire, to render the same puncture-proof.

With the above and other objects in view, as will appear as the nature of the invention is better understood, the same consists, generally stated, in inserting between the air tube and the tire at the tread thereof a shield of resilient and non-puncturable material, constructed in such manner that while being thoroughly effective for the purpose designed it will not result in the cutting or otherwise injuring of the air tube.

The invention consists further in the novel construction and combination of parts of a pneumatic tire shield, as will be hereinafter fully described and claimed.

In the accompanying drawings forming a part of this specification, and in which like characters of reference indicate corresponding parts:—Figure 1 is a view in transverse section through an automobile tire equipped with the improvements of the present invention. Fig. 2 is a view in longitudinal section. Fig. 3 is a perspective detail view in section of a portion of the shield.

Referring to the drawings, 1 designates the sheath and 2 the inner tube of an ordinary automobile tire, and as the exact construction of these parts forms no part of the present invention further description is deemed unnecessary.

The present invention resides in the novel form of shield or armor designated generally 3, which, as shown in Fig. 1, is inserted between the sheath and the inner tube at the crest of the tire where punctures most generally occur. This shield may be made of any width desired that shown being one that will be thoroughly effective in securing the objects sought. The shield comprises a metallic strap 4, preferably of sheet steel, which is embedded and vulcanized in a casing of rubber constructed in the same manner as the sheath of an ordinary pneumatic tire, that is to say of rubber and fabric. As shown in Fig. 3, the shield is approximately meniscus or crescent shape in cross section in order to conform with approximate accuracy to the contour of the inner wall of the sheath and the outer wall of the air tube. The metallic strip 4 is herein shown as flat but it is to be understood that if preferred it may be dished in cross section and as this will be obvious detailed illustration is omitted.

As shown in Fig. 2, the terminals of the shield are oppositely inclined as at 5, in order that when the shield is positioned, there will be no enlarged portion or hump formed at the junction of the terminals.

It will be seen from the foregoing description that although the improvements herein defined are simple in character, that they will be thoroughly efficient for the purpose designed, and may be readily applied to a tire already in use, without requiring any change whatever in its structural arrangement.

By reason of the fact that the material 3 is crescent shaped in cross section and the strip of metal 4 is flat; when the shield is inserted between the inner and outer tubes and the inner tube is inflated, angles are formed in the said inner tube which occur at the edges of the shield and the portion of the inner tube between the said angles is flat and parallel with the flat metallic strip. Hence, the binding of the shield between the inner and outer tubes occurs at the edges of the shield beyond the strip and thus the said shield is prevented from working around laterally in either direction between the said tubes.

I claim:—

In combination with a pneumatic tire comprising an inner and outer tube, a shield having opposite ends inserted between the tubes and composed of a strip of flexible elastic material crescent shaped in cross section and a strip of metal which is flat in cross section embedded in the flexible material, the arrangement and contour of the parts being such that gripping angles of contact between the inner tube and the edges of the shield will be formed in the said tube when inflated whereby the shield is retained against lateral movement between the tubes, said shield having its ends oppositely inclined and overlapping each other.

In testimony that I claim the foregoing as my own, I have hereto affixed my signature in the presence of two witnesses.

GEORGE NOYES.

Witnesses:
JOE T. WILLIAMS,
H. R. BITZING.